(12) United States Patent
Podgorny et al.

(10) Patent No.: US 11,017,167 B1
(45) Date of Patent: May 25, 2021

(54) MISSPELLING CORRECTION BASED ON DEEP LEARNING ARCHITECTURE

(71) Applicants: Igor Podgorny, San Diego, CA (US); Faraz Sharafi, San Diego, CA (US); Matthew Cannon, San Diego, CA (US); Pavlo Malynin, Mountain View, CA (US); Jeff Geisler, San Diego, CA (US); Yason Khaburzaniya, San Diego, CA (US); Greg Coulombe, Edmonton (CA)

(72) Inventors: Igor Podgorny, San Diego, CA (US); Faraz Sharafi, San Diego, CA (US); Matthew Cannon, San Diego, CA (US); Pavlo Malynin, Mountain View, CA (US); Jeff Geisler, San Diego, CA (US); Yason Khaburzaniya, San Diego, CA (US); Greg Coulombe, Edmonton (CA)

(73) Assignee: Intuit Inc., Mountain View, CA (US)

( * ) Notice: Subject to any disclaimer, the term of this patent is extended or adjusted under 35 U.S.C. 154(b) by 53 days.

(21) Appl. No.: 16/024,550

(22) Filed: Jun. 29, 2018

(51) Int. Cl.
| | |
|---|---|
| *G06F 40/232* | (2020.01) |
| *G06N 3/08* | (2006.01) |
| *G06K 9/62* | (2006.01) |
| *G06N 20/00* | (2019.01) |
| *G06F 16/951* | (2019.01) |

(52) U.S. Cl.
CPC .......... *G06F 40/232* (2020.01); *G06F 16/951* (2019.01); *G06K 9/6267* (2013.01); *G06N 3/08* (2013.01); *G06N 20/00* (2019.01)

(58) Field of Classification Search
CPC ...... G06F 17/28; G06F 17/273; G06F 3/0237; G06F 40/232; G06F 16/951; G06N 3/08; G06N 20/00; G06K 9/6267
See application file for complete search history.

(56) References Cited

U.S. PATENT DOCUMENTS

| | | | | |
|---|---|---|---|---|
| 2009/0254819 | A1* | 10/2009 | Song | G06F 17/273 715/257 |
| 2012/0246133 | A1* | 9/2012 | Hsu | G06F 17/276 707/706 |
| 2013/0283156 | A1* | 10/2013 | Al Badrashiny | G06F 17/273 715/257 |
| 2016/0110327 | A1* | 4/2016 | Knox | G06F 40/232 704/9 |
| 2016/0154861 | A1* | 6/2016 | Hegerty | G06F 40/232 707/728 |
| 2016/0299882 | A1* | 10/2016 | Hegerty | G06Q 50/01 |
| 2018/0107642 | A1* | 4/2018 | Gliozzo | G06F 16/3322 |
| 2018/0107643 | A1* | 4/2018 | Gliozzo | G06F 16/3322 |

(Continued)

*Primary Examiner* — Angela A Armstrong
(74) *Attorney, Agent, or Firm* — Ferguson Braswell Fraser Kubasta PC (57) ABSTRACT

The invention relates to a method. The method includes receiving a flawed input comprising a domain specific misspelling. The method further includes encoding, by an encoder machine learning model executing on a computer processor, the flawed input on a per character basis to create a context vector. The method further includes decoding, by a decoder machine learning model executing on the computer processor, the context vector on the per character basis to create a rephrased input lacking the domain specific misspelling. The method further includes presenting the rephrased input.

20 Claims, 5 Drawing Sheets

(56) References Cited

U.S. PATENT DOCUMENTS

| | | | |
|---|---|---|---|
| 2018/0150572 A1* | 5/2018 | Yates | G06Q 50/01 |
| 2018/0246876 A1* | 8/2018 | Allen | G06F 40/247 |
| 2019/0057306 A1* | 2/2019 | Xue | G06N 3/0445 |
| 2019/0079934 A1* | 3/2019 | Liao | G06F 16/24578 |

* cited by examiner

MISSPELLING CORRECTION BASED ON DEEP LEARNING ARCHITECTURE

BACKGROUND

One of the functions of a computing system is to provide access to large volumes of data. For example, in the case of a search engine, the large volumes of data may be a collection of websites. In a user support system, the large volumes of data may be search queries or frequently asked questions. In contrast to humans, computer systems do not have native capabilities to interpret underlying meanings behind questions. Specifically, computing systems may have challenges interpreting the underlying request of the user. Thus, whereas a human may ascertain a meaning and responding appropriately, the computing system is challenged in providing a response to input from a user.

SUMMARY

In general, in one aspect, one or more embodiments relate to a method comprising receiving a flawed input comprising a domain specific misspelling; encoding, by an encoder machine learning model executing on a computer processor, the flawed input on a per character basis to create a context vector; decoding, by a decoder machine learning model executing on the computer processor, the context vector on the per character basis to create a rephrased input lacking the domain specific misspelling; and presenting the rephrased input.

In general, in one aspect, one or more embodiments relate to a system comprising a computer processor; a user interface configured to receive a flawed input; an trained encoder model for executing on the computer processor to cause the computer processor to encode the flawed input at a character level to create a context vector; and a trained decoder model for executing on the computer processor to cause the computer processor to decode the flawed input from the context vector at the character level into a rephrased input.

In general, in one aspect, one or more embodiments relate to a non-transitory computer readable medium comprising computer readable program code for causing a computer system to clarify a search input, by a classifier, as a flawed input; encode the input at a character level, by a trained encoder model executing on a processor, to create a context vector; decode the context vector at the character level, by a trained decoder model executing on a processor, to create a rephrased input; and present the rephrased input.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the invention, the various disclosed embodiments may be combined in virtually any manner. All combinations are contemplated herein.

In general, embodiments of the invention are redirected to identifying flawed inputs and rephrasing the flawed inputs using a machine learning encoder and decoder model. Specifically, one or more embodiments are directed to encoding a flawed input on a character basis level to create a context vector using an encoder machine learning model, and then decoding the context vector into a rephrased input using a decoder machine learning model.

Figure 1:
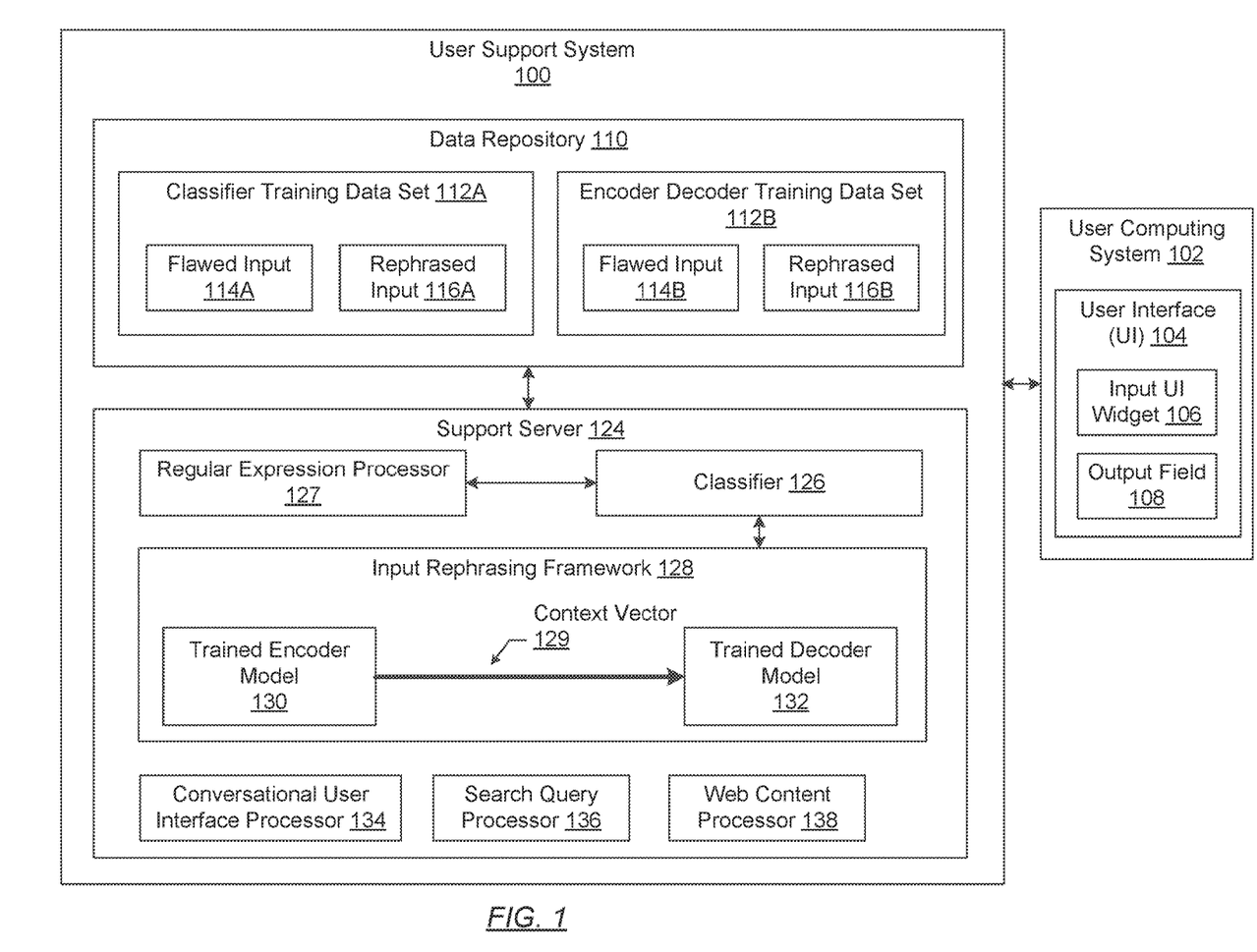
FIG. 1 shows a user support system in accordance with one or more embodiments.

FIG. 1 shows a diagram for a system. The system includes a user support system (100) and a user computing system (102) in accordance with one or more embodiment. The user support system (100) includes a data repository (110) and a support server (124). The user support system (100) also communicates with the user computing system (102). Each of these components is described below.

In one or more embodiments, data repository (110) is any type of storage unit and/or device (e.g., a file system, database, collection of tables, or any other storage mechanism) for storing data. Further, the data repository (110) may include multiple different storage units and/or devices. The multiple different storage units and/or devices may or may not be of the same type or located at the same physical site.

In one or more embodiments, the data repository (110) includes functionality to store classifier training data set (112A) and encoder decoder training set data (112B). The classifier training data set (112A) and encoder decoder training data set (112B) have data for training the machine learning models. Specifically, machine learning algorithms include at least two phases, a training phase and a prediction phase.

In the training phase for the classifier training data set (112A), the machine learning model is trained to classify an input based on whether an input (described below) has a domain specific misspelling. In other words, the machine learning model receives a set of input and classifies the inputs of a given set into two groups on the basis of a classification rule. For example, the inputs may be classified by a rule determining the correct spelling of a word.

In the training phase for the encoder decoder training set (112B), the machine learning model is trained to produce certain output based on a set of input. In other words, the machine learning model is provided with input and the corresponding output. In the prediction phase, the machine learning model generates an output when provided with input. The set of input used during the training phase may not match the input provided during the prediction phase.

As shown in FIG. 1, the classifier training data set (112A) and encoder decoder training data set (112B) include a flawed input (114A and 114B) and a rephrased input (116A and 116B). In general, an input is a submission from a user. The input may be a search query, an interrogative sentence or clause, an answer to a query or question. The flawed input (114A and 114B) is submission to the machine learning model and the rephrased input (116A and 116B) is an output. Specifically, the flawed input (114A and 114B) is an input detected as having a flaw, such as an unintentional misspelling or intentional misspelling. In one or more embodiments, the flaw may be a correct spelling with improper hyphenation. The flaw may cause the input to not accurately represent the user's intended inquiry, such as the user's problem or a user's search. Further, for input corresponding to a response, the flaw may cause the response not to be presented or read. In other words, the flaw may prevent or limit the response search software from providing a responsive answer to the problem, particularly when the flaw is domain specific. A rephrased input is a input that is rephrased. Specifically, the rephrasing corrects the flaw by removing the misspelling.

One or more embodiments is directed to correcting domain specific misspellings. A domain is the area of activity of the user support system. In other words, the domain is the subject matter of the inputs submitted to the user support system (100). The user support system (100) may support a single domain or multiple domains. A domain specific misspelling is a term or group of terms that is incorrectly spelled in the particular domain but is not misspelled outside the domain. In some embodiments, a domain specific misspelling causes the term or group of terms to have ambiguous meaning within the context of the domain. For example, "tx" may be "Texas" or "taxes" in the financial domain. For example, a flawed input, may include a misspelling or a set of characters not properly recognized by the search software (e.g. "error 123" vs. "error code 123").

Because of the flaw, a computer system, without a machine learning approach, may be unable to provide support for the user's problem that lead to the input or may be unable to present the input. Specifically, flawed inputs (114A and 114B) may show frustration with a software product while being too ambiguous because of the domain specific misspelling to perform a search for the solution. Even if the answer that is provided by a search to the flawed input has properly addressed the user's problem, the flawed input, once recorded in a repository, may prevent searching users from finding relevant search results. Users are more likely to select search results that are spelled correctly. Accordingly, one or more embodiments both improves computer-human interactions via a search and human-to-human interactions via a computer.

In the encoder decoder training data set (112B), each flawed input (114B) is related to one or more corresponding rephrased inputs (116B). The relationship between the flawed input (114B) and the rephrased input (114B) allows the machine learning models to be trained. A rephrased input (116B) is an input that does not exhibit the same flaw as the flawed input (114B). For example, for a misspelled or partially misspelled input, the rephrased input (116B) does not have the misspelling or partially misspelling.

In one or more embodiments, rephrased inputs (116A and 116B) are correctly spelled and complete for the domain. Further, the rephrased input (116A and 116B) may lack ambiguity. In one or more embodiments, the rephrased inputs (116A and 116B) are complete sentences or partially complete sentences. For example the rephrased input (116A and 116B) may consist only of the spelling corrections from the flawed input (114A and 114B).

Continuing with the user support system in FIG. 1, the data repository (110) is communicatively connected to a support server (124). The support server (124) includes functionality to obtain data from the data repository and store data in the data repository. The support server is hardware, software, or any combination thereof. For example, the support server may be a computing device described below with reference to FIGS. 5A and 5B. The support server may be a hardware server, a server executing in a virtual machine on corresponding hardware.

In one or more embodiments, support server (124) may include a number of servers (e.g., racked servers) connected by a network (e.g., a local area network (LAN) or a WAN) to each other in a cluster (e.g., a load-balancing cluster, a Hadoop cluster, a Beowulf cluster, etc.) or other distributed system which may run website software (e.g., web-server software, database software, etc.) and distributed-computing and/or cloud software such as Apache Spark™, Map-Reduce, Google File System, Hadoop, Hadoop File System, Hadoop YARN, Hive, Dremel, CloudBase, Memcached, Redis, etc., which may be deployed alone or in combination. Additionally, or alternatively, support server (124) and/or data repository (110) may be hosted wholly or partially in a (1) public cloud; and/or (2) a private cloud. In one or more embodiments, the cloud resources may serve as a platform-as-a-service (PaaS) or an infrastructure-as-a-service (IaaS).

In one or more embodiments, the support server (124) is configured to provide context specific support to the user computing system. The context specific support considers not only the input provided by the user, but also the context of the input. For example, the context specific support may include the software application being used by the user, the version of the software application being used, domain of the software application, the information being displayed to the user at the time of the input, and other information. The context may be detected and/or provided by the user (e.g., using the user interface).

In one or more embodiments, support server (124) includes a regular expression processor (127), a classifier (126), a search rephrasing framework (128), a conversational user interface processor (134), a search query processor (136), and a web content processor (138).

In one or more embodiments, the classifier (126) classifies an input as having an error. The classifier (126) may classify errors based on a domain specific level. For example, an input may be phrased as "need to pay tx". The classifier (126) determines that the input "need to pay tx" has an error based on the domain of the input and sends the error to the machine learning model for correction. In some embodiments, the classifier determines that "tx" is the source of the error in the example input. In one or more embodiments, the classifier (126) may be a neural network or any other type of machine learning network. In one or more embodiments, the classifier (126) analyzes the input at a character basis level.

In one or more embodiments, the regular expression processor (127) is a software processor that is configured to find a replace misspelled words in an input, a search query, a complete sentence, a partial sentence, or a question. The regular expression processor may be used to replace misspelled words that the classifier (126) determines are common misspelled words. A common misspelled word is a word that is misspelled more than a threshold number of times. The common misspelled word may be a domain specific misspelling or generic to multiple domains. For example, the input may be "How do I connect to the Internet?". The classifier may determine that the input may be fixed using regular expressions as "Internet" is a commonly misspelled word without a particular domain.

The input rephrasing framework (128) is a machine learning framework that includes functionality to transform flawed inputs into rephrased inputs. In one or more embodiments, the input rephrasing framework (128) includes two distinct machine learning models to rephrase a single input. In one or more embodiments, once trained, the two machine learning models operate independently. The encoder machine learning model (130) is configured to generate a context vector (129) from a flawed input. In other words, the encoder machine learning model (130) is configured to encode the flawed input and create a context vector (129). The decoder machine learning model (132) is configured to decode the context vector (129) into a rephrased input.

The encoder machine learning model (130) and the decoder machine learning model (132) are in the deep learning machine learning models. Deep learning, also known as deep structured learning or hierarchical learning, is part of a broader family of machine learning methods based on learning data representations, as opposed to task-specific algorithms. The encoder machine learning model (130) and the decoder machine learning model (132) may each be recurrent neural networks (RNN). In other words, the system may have at least two RNN, one for each of the encoder machine learning model (130) and one for the decoder machine learning model (132). An RNN is a network that operates on a sequence and uses its own output as input for subsequent steps. The RNN may be a single or multilayer RNN. Further, the RNN may be a long short term memory (LSTM) RNN. The expression long short-term refers to the fact that LSTM is a model for the short-term memory which can last for a long period of time. An LSTM is well-suited to classify, process and predict time series given time lags of unknown size and duration between events. LSTM units are the building blocks of the layers of the RNN in one or more embodiments. Further, the encoder machine learning model and the decoder machine learning model may form a sequence to sequence (seq2seq) network. In one or more embodiments, the encoder-decoder model may also be other deep learning models such as Convolution Neural Network (CNN) and Fully Connected Network (FC), or other machine learning models.

The encoder machine learning model (130) includes a character to indices mapping. The character to indices mapping may be referred to as an encoder dictionary. The character to indices mapping maps individual characters of the input to an index value. A set of words are selected based on frequency of use in the user support system. Each character in the set of words has a unique location in a vector space. The characters to indices mapping defines the location of the characters in the vector space. When mapping a flawed input, each character is a one-hot vector, or giant vector of zeros except for a single one at the index of the word. Thus, for example, the character to indices mapping may map the character "o" in the word "network" to 05, which is represented by the vector 0 0 0 0 0 1 0 0 0 . . . 1.

Similarly, the decoder machine learning model (132) includes an indices to character mapping. The indices to character mapping has the same characteristics as described with respect to the character to indices mapping. The indices to character mapping maps index values to characters. The indices to character mapping may be referred to as a decoder dictionary. The encoder dictionary and the decoder dictionary may be the same or different. For example, the encoder dictionary may represent the same set of characters as the decoder dictionary or a different set of characters. By way of another example, the same character in the encoder dictionary and the decoder dictionary may be mapped to different index values in the different dictionaries. Returning to the "network" example above, the index to character mapping of the decoder dictionary may map the "o" in the word "network" to 23, which is represented by the vector of zeros with a one in the twenty-third position.

Continuing with the encoder machine learning model (130), the encoder machine learning model creates a context vector (129). The context vector is a hidden state of the encoder machine learning model (130) and encodes the meaning behind of the flawed input. In one or more embodiments, the context vector (129) has fixed dimensionality. The size of the context vector is independent of the length of the flawed input. In one or more embodiments, context vector is a numeric sequence.

In one or more embodiments, the support server (124) includes a conversational user interface processor (134). The conversational user interface processor (134) manages a session for a user to interact with a person in real time. In one or more embodiments, the conversational user interface processor (126) is configured to receive an input and direct the connection of the user to a department or agent based on the input. The conversation user interface processor (126) may further pass messages between the user and the agent. In one or more embodiments, the flawed input is identified and corrected before the conversational user interface processor directs the user to the right department or person for help related to the user's input. For example, a user may log on to a website to look for help related to filing a tax form. The user may begin the conversation by asking about "error 123", which has a domain specific misspelling. The rephrased input "error code 123" is used by the conversation user interface processor to direct the user to the correct department to seek help related to the rephrased input.

In one or more embodiments, the support server (124) includes a search query processor (136). The search query processor (136) is configured to perform a search based on a search query. The search query processor (136) is configured to receive a flawed input when a user enters a search into a search bar on the website. In one or more embodiments, the search query processor (136) may use the rephrased input without displaying the rephrased input to the user. In one or more embodiments, the search query processor (136) may display the rephrased input to the user before searching. For example, the user may use a search feature on a website to search for "error 123". The search query processor (136) may obtain the rephrased input "error code 123" to produce a better search result for the user.

In one or more embodiments, the support server (124) includes a web content processor (138). The web content processor (138) is configured to post content to a website. The content posted by the web content processor (138) may be questions and answers or other content that is domain specific. The web content processor (138) may receive a flawed input when a user enters a question into a website that allows for other users to provide answers, or when a user enters an answer. In one or more embodiments, the web content processor (138) may replace the flawed input with the rephrased input before the question is posted to the website. For example, a user may enter a question "What is error 123?". The web content processor (138) may replace the input with "What is error code 123?". Thus, other users are more likely to find the question and read the answer.

The various software processors (e.g., conversation user interface processor (134), search query processor (136) and web content processor (138)) may be configured to direct inputs to the classifier and other components of the support server before processing the original input or rephrased input. In other embodiments, the classifier is configured to intercept and process inputs before sending the rephrased query to the software processor. As another example, another component may be configured to process the input.

Continuing with FIG. 1, the user support system (100) is communicatively connected to the user computing system (102). For example, the user support system (100) may be connected via a network to the user computing system (102). In one or more embodiments, user computing system (102) is a computing system, such as the computing system described below with reference to FIGS. 5A and 5B. User computing system (102) provides, to a user, various computing functionality. For example, the computing functionality may include word processing, multimedia processing, financial management, social network connectivity, network management, and/or various other functions that a computing device performs for a user. The user may be a customer or a potential customer of the user support system. In one or more embodiments, the user computing device (102) includes at least one user interface (104) for connecting to the user support system (100).

The user interface (104) is an interface for receiving input from a user and transmitting output to the user. For example, the user interface (104) may be a graphical user interface or other user interface. The user interface (104) is displayed in a local application in accordance with one or more embodiments. For example, the user interface (104) may be generated by a remote web application and transmitted to a user's web browser. By way of another example, the user interface may be an interface of a software application providing the functionality to the user (e.g., a local gaming application, a word processing application, a financial management application, etc.). In such a scenario, the help menu, popup window, frame, or other portion of the user interface may connect to the user support system (100) and present output. In one or more embodiments, the user interface includes an input user interface (UI) widget (106) and an output field (108). The input UI widget (106) is a user interface component that includes functionality to receive input from a user, such as a search query or an answer. For example, the input UI widget may be a text box. The output field (108) includes functionality to present results to the user. For example, the output field may include functionality to present one or more rephrased inputs. The output field may be further associated with a user interface widget to receive a selection of a rephrased input from the one or more presented rephrased inputs. In one or more embodiments, the output field (108) further includes functionality to present answers to a user.

Figure 2:
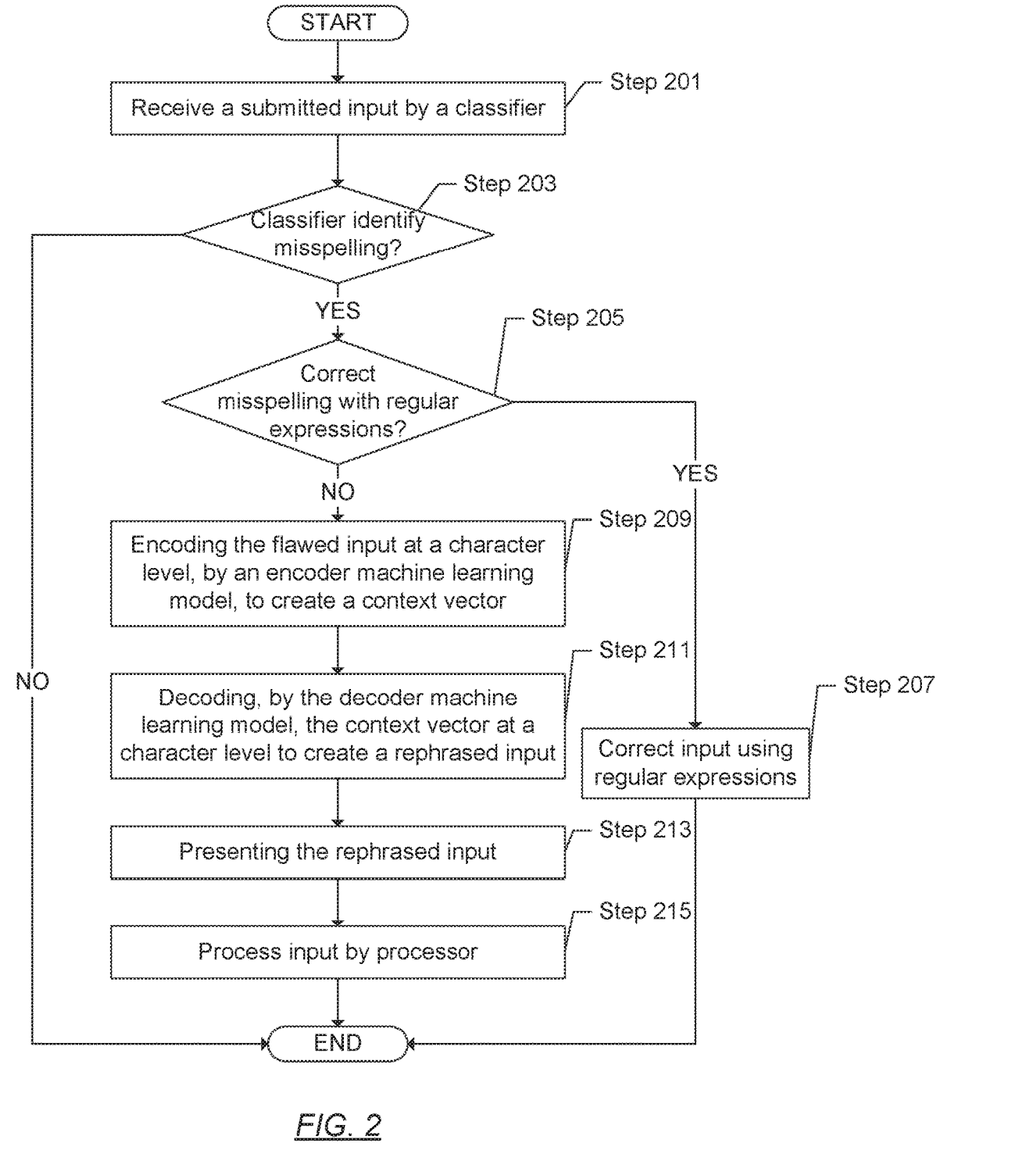
FIG. 2 depict a flowchart for classifying an input in accordance with one or more embodiments.

FIG. 2 is a flowchart diagram of a process for rephrasing a flawed input, in accordance with one or more embodiments. In one or more embodiments, the operations shown in FIG. 2 and the flowcharts below may be performed by software running on support server using data repository.

In Step 201, a submitted input is received by a classifier. The submitted input may be received from the user interface widget from a user which is then sent to the classifier. For example, the user may submit the input through a local application executing on the user's computing device (e.g., using a browser or other application). The input may be transmitted, via the network, using various communication protocols to the support server. A software processor, such as the software processor described above, may have a classifier or may transmit the submitted input to the classifier. As another example, the classifier may intercept the submitted input. In one or more embodiments, the input may be submitted in multiple strings. Thus, each string corresponds to a portion of the input. For example, the input may contain 3 sentences, but each sentence is submitted individually to the classifier to be analyzed.

In Step 203, the classifier determines whether an error exists in the submitted input. In one or more embodiments, the classifier classifies the input as to whether an error in the input exists. The classifier analyzes the input on a character basis level to determine if the input is a flawed input. For example, the classifier may be trained to extracts features from the input and, based on the features, classify the submitted input into classes of correctly spelled, and misspelled. For example, the classifier may be a Bayesian classifier. A Bayesian classifier determines the posterior probability that a submitted input is in a class based on the probabilities of the features being in the class and the class having the features. Because misspelling are domain specific, because misspellings may span multiple terms, and because of the volume of possible misspellings, enumerating the misspellings is computationally infeasible. Thus, direct identification of a submitted input as a flawed input using an enumerated method is computationally infeasible. By using a classifier, one or more embodiments are able to classify whether a submitted input is misspelled without having been trained for the misspelling in the submitted input.

If the classifier identifies a misspelling, the process moves to step 205. If the classifier does not identify a misspelling, the process ends.

In Step 205, a determination is made whether to correct the misspelling with regular expressions. As described above, enumerating all possible misspellings may be computationally infeasible as is having a regular expression to recognize and revise each misspelling. Common misspellings may be corrected with regular expressions. For example, a regular expression may exist for each common misspelling. The classifier may be trained to determine whether to correct the misspelling with regular expressions. In one or more embodiments, the classifier makes a decision based upon domain specific misspellings or a common misspelling. For example, the classifier may determine that regular expressions may not fix the flawed input related to a domain specific misspelling and, therefore, send the flawed input to the trained machine learning models. For example, the flawed input "error 123" is sent to the trained machine learning model as the flawed input does not contain a basic misspelling but a domain specific misspelling. In another example, the flawed input may contain a common misspelling, such as "eror code 123", and be sent to the regular expressions processor to be fixed. If the classifier determines that the misspelling should be corrected with regular expressions, the process moves to step 207. If the classifier determines that the misspelling should be corrected with the trained learning model, the process moves to step 209. By way of another example, the regular expressions may be applied prior to Step 203 to determine if a common misspelling exists and to correct the common misspelling.

In Step 207, the input is corrected using regular expressions. Regular expressions are used for common misspellings identified by the classifier. Regular expressions are rules that define an input sequence and an output. If at least a portion of the submitted input satisfies the input sequence, then the result is specified by the output, which applies the correction. For the input, the regular expression specifies an ordering of characters. Thus, to determine whether the submitted input satisfies the input sequence, each character in the submitted input is compared to a corresponding location in the regular expression to determine whether the character in the submitted input is the same as the character of the corresponding location. If the regular expression is satisfied, then the output of the regular expression is the rephrased input specified by the regular expression. If the regular expression is not satisfied, the next regular expression may be analyzed with the collection of submitted input. The process may end after the input is corrected.

Returning to Step 205, if a determination is made not to correct the misspelling with a regular expression, the misspelling is corrected by the encoder decoder machine learning model. In Step 209, the flawed input is encoded at a character level by an encoder machine learning model to create a context vector. Specifically, machine learning is applied to the flawed input to transform the flawed input into a context vector. The encoder dictionary is applied to the flawed input to obtain the indices for the characters of the flawed input. The indices are used to create vectors for the characters. Through several layers of the encoder machine learning model, the encoder creates output and a hidden state. The last hidden state is the context vector. The last output may be ignored, thus, the encoder machine learning model receives, as input, the variable-length input sequence, and outputs a fixed-length context vector. The context vector is a feature vector representing the input sequence. Thus, the encoder machine learning model is responsible for stepping through the input time steps and encoding the entire sequence into a fixed length vector called a context vector.

In Step 211, the context vector is decoded at a character level into a rephrased input by a decoder machine learning model. The decoder machine learning model has a similar structure as the encoder machine learning model but in opposite orientation. The decoder machine learning model takes the context vector as the first hidden state and creates a variable-length sequence. At the end of processing, the variable length sequence is a set of vectors having a one at a particular location. The decoder dictionary is applied to the set of vectors to obtain characters but is different than the flawed input. The characters decoded by the decoder machine learning model is the rephrased input. Thus, the decoder machine learning model is responsible for stepping through the output time steps while reading from the context vector.

In Step 213, the rephrased input is presented. For example, the rephrased input may be presented to the user's computing system (e.g., transmitted to the user's computing system, displayed, or otherwise presented). By way of another example, the rephrased input may be presented to a software processor, such as the conversation user interface processor, the search query processor, or the web content processor. The actions of the software processor may be performed with or without human interaction.

In Step 215, the input is processed by a processor. For example, the input may be directed to a certain portion of a website depending on the processor involved. For example, the input may have initiated from a search engine on a website; therefore, the search query processors directs the input back to the search engine. The conversational user interface processors and web content processors may also direct the input to a certain portion of the website depending on the origin of the input.

Figure 3:
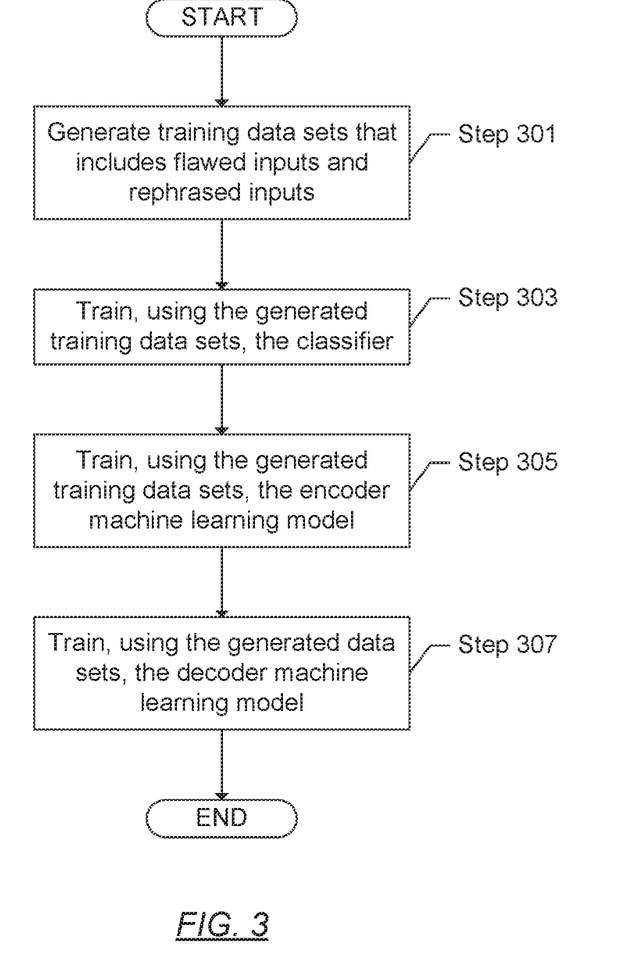
FIG. 3 depict a flowchart for training a machine learning model in accordance with one or more embodiments.

FIG. 3 is a flowchart diagram of a process for training the machine learning encoder and decoder models in accordance with one or more embodiments. The encoder dictionary and decoder dictionary may be predefined. Specifically, character frequency within the field of the user support framework is used to select the set of characters to represent in the encoder dictionary and the decoder dictionary. Thus, if the user support framework provides networking support services, then the character router, switch, and other networking words may be in the respective dictionaries while such characters would not be included in a user support framework for vehicle maintenance. For the encoder dictionary, common abbreviations (e.g., "4" for "for") used in searches or asking questions of the user support framework may also be selected. For the decoder dictionary, proper language may be selected. The index values in the words may be randomly defined. In particular, the index value assigned to a selected character is irrelevant as long as a one-to-one mapping exists in one or more embodiments. Remaining unselected characters (i.e., characters that are not selected) will be associated with a predefined value in the index for unknown character.

In Step 301, training data sets are generated that include flawed inputs and rephrased inputs. When the training data sets are generated, the flawed inputs are related to the corresponding rephrased inputs. One technique for creating flawed queries is to insert various flaws into correct inputs. The correct inputs are inputs that are verified, such as by a human, as lacking misspellings including domain specific misspellings and are exemplary. The correct input is the rephrased input in the training data and the corresponding flawed input(s) is the one or more inputs generated by inserting the misspellings into the correct input. For example, abbreviations may replace terms of the input, where the abbreviations have multiple meanings within the domain. Thus, the abbreviations add ambiguity to the input. Further, various words may be removed from the input. In one or more embodiments, words may be replaced with similar words that are within a threshold edit distance from the original word. The edit distance is the number of letters to change (replace, add, or remove) to create a new word. By way of a specific example, the word, "examiner" has an edit distance of four from the word "example." By way of another example, "foot" and "food" have an edit distance of one. One or more embodiments may further account for the similarity between words as typed on a keyboard. For example, similar words may be selected that have minimal typing distance between each other on the keyboard.

In Step 303, the classifier is trained using generated training data sets. Specifically, the classifier is trained to classify inputs as having an error, such as misspellings or partial misspellings, on a character level based on the flawed inputs from the training data sets. The classifier may be tested and assigned different values based on the performance of the classifier. The values may be a correctly classified as a misspelling which is fixed (e.g. True Positive), a correctly spelled input flagged as a misspelling and converted incorrectly (e.g. False Positive), a correct spelling recognized as a correct spelling (e.g. True Negative), and a misspelling recognized as a correct spelling (e.g. False Negative). In one or more embodiments, a correction score is calculated based on the above-mentioned values. The correction score may include a single score or multiple scores. For example, one part of the correction score may be a fraction of all the corrected misspellings based on the set of input. Another part of the correction score may be a fraction of all the partially corrected misspellings based on the set of input. In one or more embodiments, the correction score updates the machine learning model based on the calculations.

In Step 305, the encoder machine learning model is trained using the generated training data sets. Specifically, the encoder machine learning model is trained to generate a context vector from the flawed input. The context vector encodes the meaning of the flawed input.

In Step 307, the decoder machine learning model is trained using the generated training data sets. The decoder machine learning model is trained to generate the rephrased input from the context vector. Specifically, the flawed input is executed through the encoder machine learning model, and the system tracks every output and the latest hidden state. At the end of the encoder machine learning model operating on the flawed input in the training data, the latest hidden state is the context vector. The decoder machine learning model is given the start of sentence token as the decoder machine learning model's first input, and the context vector as the decoder machine learning model's first hidden state. The decoder is then trained to generate, from the context vector, the rephrased input. The process is repeated for each flawed input and rephrased input in the training data set.

Figure 4:
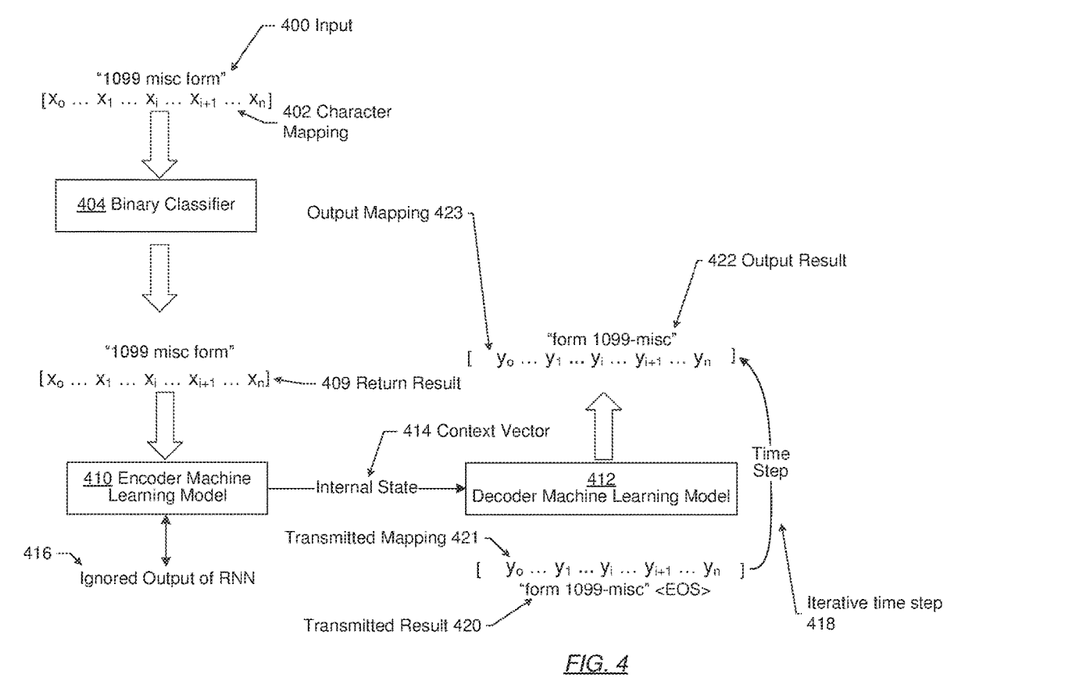
FIG. 4 shows an example for correcting an input in accordance with one or more embodiments.

FIG. 4 shows an example how the classifier and encoder and decoder models may operate. In this specific example, an input (400), "1099 misc form", is identified by the binary classifier (404). The binary classifier identifies each character of the input (402) and maps each character with an identifier (e.g., $x_o, x_i, x_{i+1} \ldots x_n$) until every character of the input (400) has been identified. The binary classifier (404) identifies which character words are spelled correctly and incorrectly. While there is no misspelling and only an abbreviation in "1099 misc form", the binary classifier recognizes that the return result (409) is a domain specific partial misspelling. In this example, the domain specification relates to financial terms.

The encoder machine learning model (410) receives the input "1099 misc form" from the binary classifier (404). The encoder machine learning model (410) encodes "1099 misc form" to a set of character indices $x_o, x_1, \ldots x_i, x_{i+1} \ldots x_n$ (409), where, for $x_i$, x is the index of $i^{th}$ character in the flawed input. The output of the encoder machine learning model is ignored (416). The encoder machine learning model (410) creates a context vector (414) to a vector multi-dimensional space. The decoder machine learning model (412) receives the context vector (414) in the vector multi-dimensional space. Through several iterative time steps as show by the arrow (418), the encoded context vector (414) is decoded to a new set of character indices defined by the transmitted mapping $y_o, y_i, \ldots y_i, y_{i+}, \ldots y_n$ (421), which is related to the transmitted result "form 1099-misc" (420). The new transmitted mapping (421) is added to the output result (422) to produce the output mapping "form 1099-misc" (423).

Figure 5A:
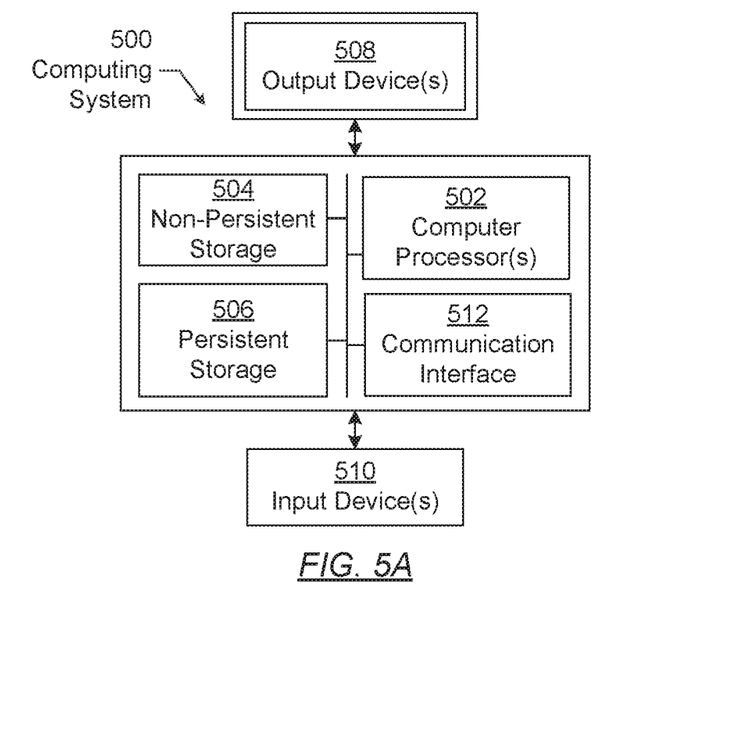
FIG. 5A and FIG. 5B depict diagrams showing a computing system in accordance with one or more embodiments.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5B:
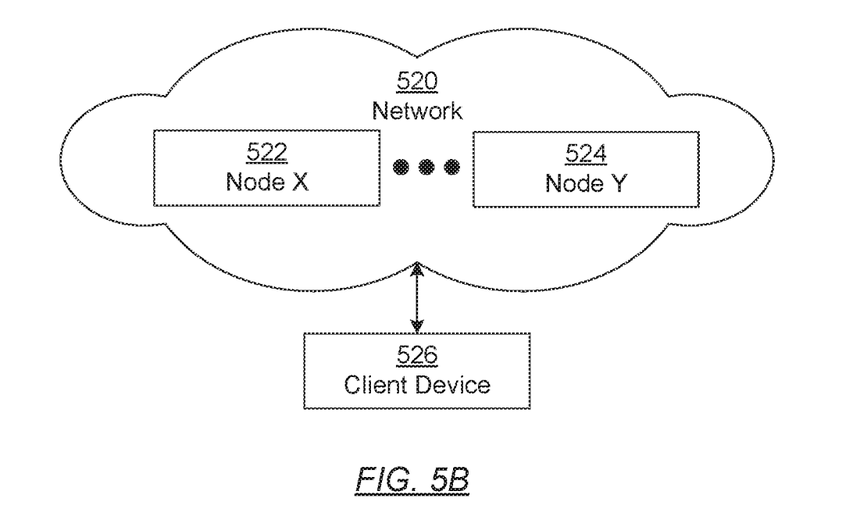

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the invention, may perform data comparison. Data comparison may be used to compare two or more data values (e.g., A, B). For example, one or more embodiments may determine whether $A>B$, $A=B$, $A\:!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
    receiving a submitted input comprising a domain specific misspelling, wherein the domain specific misspelling is a misspelling within a domain and a correct spelling outside of the domain;
    classifying, by a binary classifier, the submitted input into an incorrectly spelled class based on identifying an incorrect spelling in the submitted input, wherein the binary classifier operates on a character mapping of the submitted input and classifies into only two classes comprising the incorrectly spelled class and a correctly spelled class;
    failing to correct the misspelling; and
    based on the failure to correct the misspelling and after classifying the submitted input into the incorrectly spelled class:

receiving the submitted input comprising the domain specific misspelling as a return result of the classifying by the binary classifier;

encoding, by an encoder machine learning model executing on a computer processor, the return result on a per character basis to create a context vector;

iteratively decoding, by a decoder machine learning model executing on the computer processor, the context vector on the per character basis to create a rephrased input as an output result, the rephrased input lacking the domain specific misspelling; and presenting the rephrased input.

2. The method of claim 1, wherein classifying, by the binary classifier, the submitted input into the incorrectly spelled class is performed by performing a Bayesian classification on the submitted input.

3. The method of claim 1, comprising:

classifying a true positive value on a plurality of training sets;

classifying a false positive value on the plurality of training sets;

classifying a true negative value on the plurality of training sets;

classifying a false negative value on the plurality of training sets;

calculating a correction score for the plurality of training sets based on the true positives, the false positives, the true negatives, and the false negatives; and updating the trained encoder model based on the correction score.

4. The method of claim 1, comprising:

refining a submitted input into a plurality of strings, wherein the plurality of strings comprises multiple portions of the submitted input; and analyzing the plurality of strings by the binary classifier.

5. The method of claim 1, comprising:

identifying, via a conversational user interface processor, that the submitted input is initiated through a web conversation; and routing the submitted input from the web conversation to the binary classifier.

6. The method of claim 1, comprising:

identifying, via a search query processor, that the submitted input is initiated through a web search; and routing the submitted input from the web search to the binary classifier.

7. The method of claim 1, comprising:

identifying, via a web content processor, that the submitted input is initiated through a web post; and routing the submitted input from the web post to the binary classifier.

8. The method of claim 1, comprising:

determining, without user intervention, to analyze a search input using a plurality of regular expressions; and correcting the search input, by the regular expressions, as the rephrased input.

9. A system comprising:

a computer processor;

a user interface configured to receive a submitted input, the submitted input comprising a domain specific misspelling, wherein the domain specific misspelling is a misspelling within a domain and a correct spelling outside of the domain;

a binary classifier executing on the computer processor for causing the computer processor to classify the submitted input into an incorrectly spelled class, based on identifying an incorrect spelling in the submitted input, wherein the binary classifier operates on a character mapping of the submitted input and classifies into only two classes comprising the incorrectly spelled class and a correctly spelled class;

a regular expression processor executing on the computer processor to cause the computer processor to correct the misspelling;

a trained encoder model for executing on the computer processor to cause the computer processor, based on a failure by the regular expression processor to correct the misspelling and after classifying the submitted input into the incorrectly spelled class, to:

receive the submitted input comprising the domain specific misspelling as a return result of the classifying by the binary classifier;

encode the return result at a character level to create a context vector, wherein the trained encoder is triggered in response to the binary classifier classifying the submitted input into the incorrectly spelled class; and a trained decoder model for executing on the computer processor to cause the computer processor to iteratively decode the context vector at the character level into a rephrased input as an output result, the rephrased input lacking the domain specific misspelling.

10. The system of claim 9, wherein the binary classifier is a Bayesian classifier that is configured to classify the submitted input as the flawed input.

11. The system of claim 9, further comprising:

a conversational user interface processor for executing on the computer processor for causing the computer processor to:

identify that the submitted input is initiated through a web conversation; and route the submitted input from the web conversation to the binary classifier.

12. The system of claim 9, further comprising:

a search query processor for executing on the computer processor for causing the computer processor to:

identify that the submitted input is initiated through a web search; and route the submitted input from the web search to the binary classifier.

13. The system of claim 9, further comprising:

a web content processor for executing on the computer processor for causing the computer processor to:

identify that the submitted input is initiated through a web post; and route the submitted input from the web post to the binary classifier.

14. A non-transitory computer readable medium comprising computer readable program code for causing a computer system to:

receive a submitted input comprising a domain specific misspelling, wherein the domain specific misspelling is a misspelling within a domain and a correct spelling outside of the domain;

classify, by a binary classifier, the submitted input into an incorrectly spelled class, based on identifying an incorrect spelling in the submitted input, wherein the binary classifier operates on a character mapping of the submitted input and classifies into only two classes comprising the incorrectly spelled class and a correctly spelled class;

fail to correct the misspelling; and based on the failure to correct the misspelling and after classifying the submitted input into the incorrectly spelled class:

receive the submitted input comprising the domain specific misspelling as a return result of the classifying by the binary classifier;

encode the return result at a character level, by a trained encoder model executing on a processor and in response to the binary classifier classifying the submitted input into the incorrectly spelled class, to create a context vector;

iteratively decode the context vector at the character level, by a trained decoder model executing on a processor, to create a rephrased input as an output result, the rephrased input lacking the domain specific misspelling; and     present the rephrased input.

15. The non-transitory computer readable medium of claim 14, wherein classifying, by the binary classifier, the submitted input as the flawed input is performed by performing a Bayesian classification on the submitted input.

16. The non-transitory computer readable medium of claim 14, further comprising computer readable program code for causing the computer system to:

classify a true positive value on a plurality of training sets;

classify a false positive value on the plurality of training sets;

classify a true negative value on the plurality of training sets;

classify a false negative value on the plurality of training sets;

calculate a correction score for the plurality of training sets based on the true positives, the false positives, the true negatives, and the false negatives; and update the trained encoder model based on the correction score.

17. The non-transitory computer readable medium of claim 14, further comprising computer readable program code for causing the computer system to:

refine the submitted input into a plurality of strings, wherein the plurality of strings comprises multiple portions of the submitted input; and analyze the plurality of strings by the binary classifier.

18. The non-transitory computer readable medium of claim 14, further comprising computer readable program code for causing the computer system to:

identify, via a conversational user interface processor, that the submitted input is initiated through a web conversation; and route the submitted input from the web conversation to the binary classifier.

19. The non-transitory computer readable medium of claim 14, further comprising computer readable program code for causing the computer system to:

identify, via a search query processor, that the submitted input is initiated through a web search; and route the submitted input from the web search to the binary classifier.

20. The non-transitory computer readable medium of claim 14, further comprising computer readable program code for causing the computer system to:

identify, via a web content processor, that the submitted input is initiated through a web post; and route the submitted input from the web post to the binary classifier.

* * * * *